US012350937B2

(12) United States Patent
Miyashita et al.

(10) Patent No.: US 12,350,937 B2
(45) Date of Patent: Jul. 8, 2025

(54) CAPPING DEVICE AND LIQUID EJECTION APPARATUS

(71) Applicant: SEIKO EPSON CORPORATION, Tokyo (JP)

(72) Inventors: Eiji Miyashita, Tomi (JP); Hiromichi Takanashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 181 days.

(21) Appl. No.: 18/156,794

(22) Filed: Jan. 19, 2023

(65) Prior Publication Data

US 2023/0234358 A1 Jul. 27, 2023

(30) Foreign Application Priority Data

Jan. 21, 2022 (JP) ................................ 2022-008202

(51) Int. Cl.
*B41J 2/165* (2006.01)

(52) U.S. Cl.
CPC ................................ *B41J 2/16511* (2013.01)

(58) Field of Classification Search
CPC ........................... B41J 2/16511; B41J 2/16523
See application file for complete search history.

(56) References Cited

U.S. PATENT DOCUMENTS

2017/0129243 A1 5/2017 Otagiri et al.
2021/0237448 A1* 8/2021 Tanaka ................ B41J 2/16508
2022/0258473 A1* 8/2022 Nitobe .................... B41J 29/13

FOREIGN PATENT DOCUMENTS

JP H11-268289 A 10/1999
JP H11-268303 A 10/1999
JP 2016-175275 A 10/2016
JP 2017-087494 A 5/2017

* cited by examiner

*Primary Examiner* — Sharon Polk
(74) *Attorney, Agent, or Firm* — WORKMAN NYDEGGER

(57) ABSTRACT

A capping device includes a cap configured to form a closed space by contacting a liquid ejection head configured to eject liquid from a nozzle in a first direction having a horizontal direction component and a gravity direction component, the nozzle opening up into the closed space, and a cap moving section configured to move the cap in a second direction different from the first direction while holding the cap, wherein the second direction has a gravity direction component, the cap moving section has a guide section extending in the second direction, and the cap has a guided section guided by the guide section and is configured to be attachable to and detachable from the cap moving section from an upper end of the guide section.

5 Claims, 5 Drawing Sheets

CAPPING DEVICE AND LIQUID EJECTION APPARATUS

The present application is based on, and claims priority from JP Application Serial Number 2022-008202, filed Jan. 21, 2022, the disclosure of which is hereby incorporated by reference herein in its entirety.

BACKGROUND

1. Technical Field

The present disclosure relates to a capping device and a liquid ejection apparatus.

2. Related Art

For example, as in JP-A 2016-175275, there is a printer, as an example of a liquid ejection apparatus, including a line head, as an example of a liquid ejection head, and a cap member, as an example of a cap. The line head prints on a transported medium by ejecting liquid from a plurality of nozzles onto the medium. The cap member seals the plurality of nozzles by contacting the line head.

The cap member is removable. The cap member can be attached and detached by detaching a cover provided in the housing and an detachable unit provided in the back of the cover.

The cover described in JP-A 2016-175275 is located on a side surface different from the front surface of the printer and below the center of the printer. That is, when removing the cap member described in JP-A 2016-175275, it is necessary to pull out the cap member laterally at a low position. When the cap member described in JP-A 2016-175275 is attached, it is necessary to push the cap member laterally at a low position. Therefore, a large burden is imposed on a worker who attaches and removes the cap member.

SUMMARY

A capping device, that solves the above problem, includes a cap configured to form a closed space by contacting a liquid ejection head configured to eject liquid from a nozzle in a first direction having a horizontal direction component and a gravity direction component, the nozzle opening up into the closed space, and a cap moving section configured to move the cap in a second direction different from the first direction while holding the cap, wherein the second direction has a gravity direction component, the cap moving section has a guide section extending in the second direction, and the cap has a guided section guided by the guide section and is configured to be attachable to and detachable from the cap moving section from an upper end of the guide section.

A liquid ejection apparatus, that solves the above problem, includes a liquid ejection head configured to eject a liquid from a nozzle in a first direction having a horizontal direction component and a gravity direction component, the capping device that is configured described above, and a housing that houses the liquid ejection head and the capping device, wherein the housing has a cover configured to open and close at least a part of a top surface of the housing, the liquid ejection head is positionable between a separation position at which the liquid ejection head is separated from the cap and a contact position at which the liquid ejection head moves in the first direction from the separation position and contacts the cap, and the cap is attachable to and detachable from the cap moving section in a state in which the cover is opened and in which the liquid ejection head is at the separation position.

DESCRIPTION OF EMBODIMENTS

Embodiments

Figure 1:
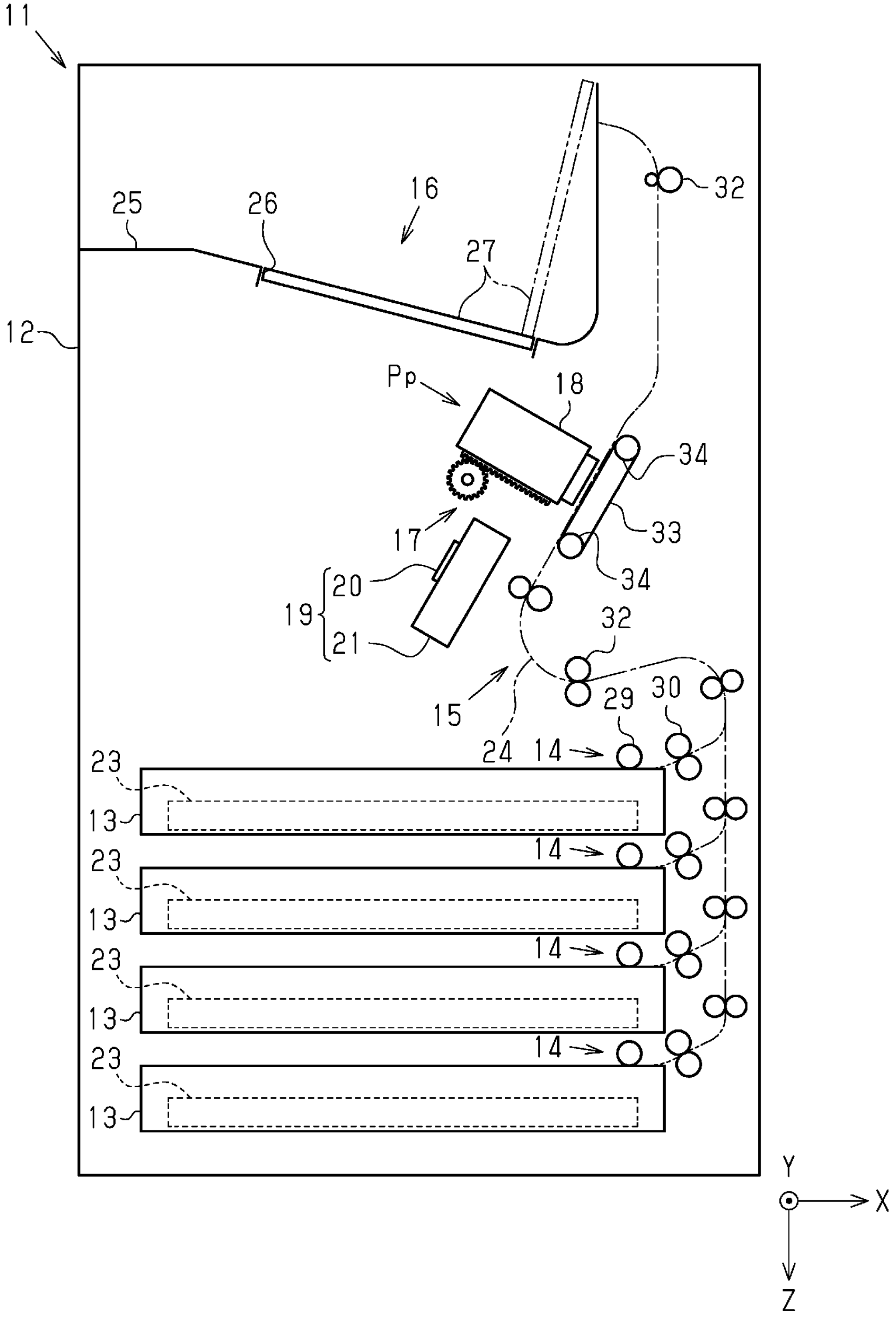
FIG. 1 is a schematic diagram of an embodiment of a liquid ejection apparatus.

Hereinafter, embodiments of a capping device and a liquid ejection apparatus will be described with reference to the drawings. The liquid ejection apparatus 11 according to the present embodiment is, for example, an inkjet printer that performs printing by ejecting ink, which is an example of a liquid, onto a medium, such as paper.

In the drawings, assuming that the liquid ejection apparatus 11 is placed on a horizontal plane, the direction of gravity is indicated by a Z-axis, and directions along the horizontal plane are indicated by an X-axis and a Y-axis. The X-axis, the Y-axis, and the Z-axis are orthogonal to each other. In the following description, a direction parallel to the X-axis is also referred to as a horizontal direction X, a direction parallel to the Y-axis is also referred to as a depth direction Y, and a direction parallel to the Z-axis is also referred to as a gravity direction Z.

Liquid Ejection Apparatus

As shown in FIG. 1, the liquid ejection apparatus 11 includes a housing 12. The liquid ejection apparatus 11 may include a medium accommodation section 13 and a feeding section 14. The liquid ejection apparatus 11 may include a plurality of medium accommodation sections 13 and the same number of feeding sections 14 as the number of medium accommodation sections 13. The liquid ejection apparatus 11 may include a transport section 15, a stacker 16, and a head moving section 17. The liquid ejection apparatus 11 includes a liquid ejection head 18 and a capping device 19. The capping device 19 includes a cap 20 and a cap moving section 21.

In FIG. 1, a transport path 24 along which a medium 23 is transported is indicated by a dashed-dotted line. The transport path 24 couples the medium accommodation section 13 and the stacker 16. The stacker 16 receives the transported medium 23.

The housing 12 accommodates various components of the liquid ejection apparatus 11. The housing 12 houses the liquid ejection head 18 and the capping device 19. The housing 12 may have a top surface 25, a maintenance hole 26, and a cover 27.

The top surface 25 is located above the capping device 19. The top surface 25 includes a horizontal direction X component and a depth direction Y component. The stacker 16 may be provided on the top surface 25.

The maintenance hole 26 is provided in the top surface 25. The maintenance hole 26 may be provided in the stacker 16.

The cover 27 may constitute at least a part of the stacker 16. The cover 27 is capable of opening and closing at least a part of the top surface 25 of the housing 12. The cover 27 may be provided so as to be rotatable about an axis (not shown.) The cover 27 according to the present embodiment, by being positioned at a closed position indicated by a solid line in FIG. 1, closes the maintenance hole 26 and constitutes a part of the stacker 16. The cover 27 according to the present embodiment, by being positioned at an open position indicated by a two dot chain line in FIG. 1, opens the maintenance hole 26. When the operator positions the cover 27 at the open position, maintenance of the transport section 15, the liquid ejection head 18, the capping device 19, and the like becomes possible through the maintenance hole 26. Maintenance includes parts replacement, cleaning, and inspection.

The medium accommodation section 13 may be capable of housing a plurality of media 23 in a stacked state.

The feeding section 14 feeds the medium 23 accommodated in the medium accommodation section 13 from the corresponding medium accommodation section 13. The feeding section 14 may include a feed roller 29 and a separation section 30. The feed roller 29 feeds the medium 23 stored in the medium accommodation section 13. The separation section 30 separates the medium 23 one by one. The feeding section 14 feeds the medium 23 accommodated in the medium accommodation section 13 one by one into the transport path 24.

The transport section 15 transports the medium 23 along the transport path 24. The transport section 15 may include a transport roller 32, an endless transport belt 33, and a pair of pulleys 34. The transport section 15 may include a plurality of transport rollers 32. The transport roller 32 transports the medium 23 by rotating in a state in which the medium 23 is pinched by the transport rollers 32. The transport section 15 discharges the transported medium 23 to the stacker 16.

Figure 2:
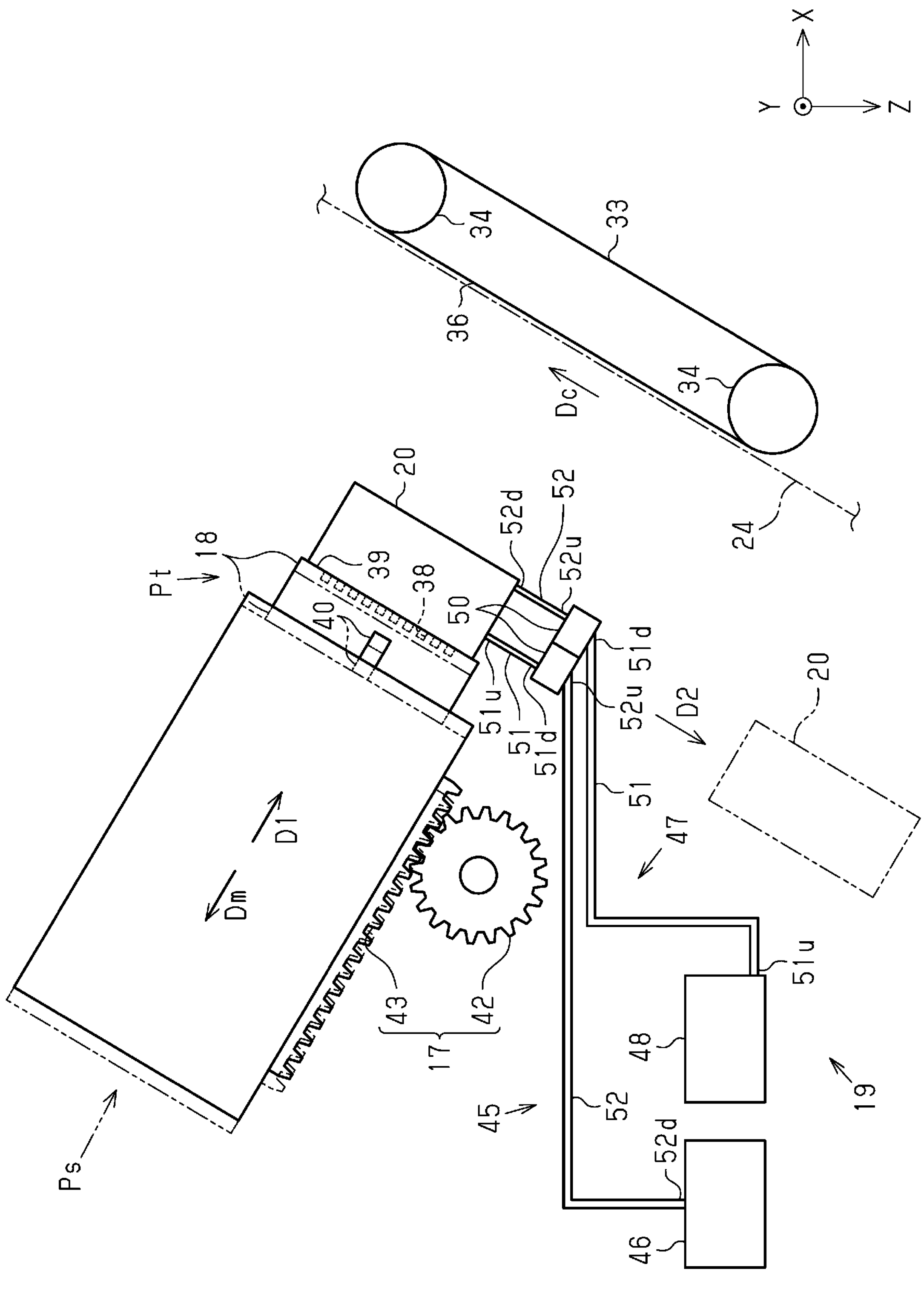
FIG. 2 is a schematic diagram of a liquid ejection head and a capping device.

As shown in FIG. 2, the transport belt 33 is bridged over a pair of pulleys 34. The transport belt 33 has a transport surface 36 that transports the medium 23. The transport surface 36 is a flat surface of the outer circumferential surface of the transport belt 33 that supports the medium 23 by electrostatic attraction, for example. The transport surface 36 forms the transport path 24. The transport belt 33 may be provided such that the transport surface 36 is inclined with respect to the horizontal plane. In the present embodiment, a direction along the transport surface 36 and in which the medium 23 is transported is referred to as a transport direction Dc. The transport belt 33 transports the medium 23 in the transport direction Dc by circulating in a state in which the medium 23 is supported on the transport surface 36.

The liquid ejection head 18 may have a nozzle face 39 in which a nozzle 38 opens. The liquid ejection head 18 may include a positioning section 40. The liquid ejection head 18 may include a plurality of positioning sections 40. The liquid ejection head 18 according to the present embodiment includes a pair of positioning sections 40 that are provided on both sides in the depth direction Y with respect to the nozzle face 39. The positioning section 40 may have a cylindrical shape.

In the liquid ejection head 18, the nozzle face 39 may be inclined with respect to a horizontal plane. The liquid ejection head 18 may be provided so that the nozzle face 39 is parallel to the transport surface 36. The liquid ejection head 18 is capable of ejecting liquid from nozzles 38 toward the first direction D1. The first direction D1 according to the present embodiment is a direction perpendicular to the transport surface 36 and the nozzle face 39. The first direction D1 includes a horizontal direction X component and a gravity direction Z component.

The liquid ejection head 18 performs printing on the medium 23 by ejecting the liquid from the nozzle 38. The liquid ejection head 18 performs printing on the medium 23 supported by the transport belt 33. The liquid ejection head 18 according to the present embodiment is a line type that performs printing by ejecting liquid onto the medium 23 being transported in a stopped state.

The head moving section 17 may include a first drive gear 42 and a first driven cog 43. The head moving section 17 may have a plurality of sets of the first drive gears 42 and the first driven cogs 43. The first driven cog 43 is, for example, a rack. The liquid ejection head 18 and the first driven cog 43 move according to rotation of the first drive gear 42.

The head moving section 17 moves the liquid ejection head 18 in a moving direction Dm, which intersects the nozzle face 39. The moving direction Dm is a direction in which the liquid ejection head 18 moves away from the transport belt 33. That is, the liquid ejection head 18 is provided so as to be movable with respect to the transport surface 36. The moving direction Dm according to the present embodiment is a direction opposite to the first direction D1. When the liquid ejection head 18 moves along a curved guide (not shown), the moving direction Dm may be a direction along the curved guide.

The head moving section 17 moves the liquid ejection head 18 in the moving direction Dm by forward rotation of the first drive gear 42. The head moving section 17 moves the liquid ejection head 18 in the first direction D1 by reverse rotation of the first drive gear 42.

The liquid ejection head 18 may be positionable at a printing position Pp shown in FIG. 1, a separation position Ps shown by a two dot chain line in FIG. 2, and a contact position Pt shown by a solid line in FIG. 2. The printing position Pp is a position at which the liquid ejection head 18 ejects liquid to perform printing on the medium 23. The separation position Ps is a position moved in the moving direction Dm from the printing position Pp. The contact position Pt is a position between the separation position Ps and the printing position Pp.

The cap 20 is capable of forming a closed space, into which the nozzle 38 opens, by contacting the liquid ejection head 18. The formation of the closed space by the cap 20 is also referred to as capping. The cap 20 can be positioned at a retreated position indicated by a two dot chain line in FIG. 2 and a capping position indicated by a solid line in FIG. 2. The cap 20 located at the capping position moves in the second direction D2 to be located at the retreated position. The second direction D2 includes a gravity direction Z component. The second direction D2 according to this embodiment includes a component in the direction opposite to the horizontal direction X and a gravity direction Z component. The second direction D2 may be a direction opposite to the transport direction Dc, or may be a direction parallel to the transport surface 36 and the nozzle face 39.

The retreated position is a position away from the movement region of the liquid ejection head 18. When the cap 20 is in the retreated position, the liquid ejection head 18 is movable from the printing position Pp to the separation position Ps.

The cap 20 located at the capping position caps the liquid ejection head 18 located at the contact position Pt. The cap 20 located at the capping position is located between the liquid ejection head 18 located at the separation position Ps and the transport surface 36. In other words, the separation position Ps of the liquid ejection head 18 is a position away from the cap 20 located at the capping position. The contact position Pt of the liquid ejection head 18 is a position at which the liquid ejection head 18 moves from the separation position Ps to the first direction D1 and contacts the cap 20.

The capping device 19 may include discharge flow paths 45, a waste liquid container 46, a moisturizing flow path 47, and a moisturizing liquid storage container 48. Each of the discharge flow path 45 and the moisturizing flow path 47 may include a joint section 50, a first flow path 51, and a second flow path 52.

The capping device 19 may include a plurality of discharge flow paths 45. The capping device 19 may include a plurality of moisturizing flow paths 47. The plurality of joint sections 50 may be formed integrally. When the first flow path 51 and the second flow path 52 are coupled to the joint section 50, the liquid can flow from the first flow path 51 to the second flow path 52. The second flow path 52 is coupled to the first flow path 51 via the joint section 50.

The discharge flow path 45 is capable of discharging the liquid in the cap 20. That is, in the discharge flow path 45, the liquid flows from the cap 20, which is upstream, to the waste liquid container 46, which is downstream. The waste liquid container 46 stores the liquid discharged from the cap 20 as waste liquid.

In the first flow path 51 of the discharge flow path 45, the first upstream end 51*u* is coupled to the cap 20 and a first downstream end 51*d* is coupled to the joint section 50. In the second flow path 52 included in the discharge flow path 45, a second upstream end 52*u* is coupled to the joint section 50, and a second downstream end 52*d* is coupled to the waste liquid container 46. In the discharge flow path 45, at least the first flow path 51 may be detachable from the joint section 50.

The moisturizing flow path 47 can supply a moisturizing liquid into the cap 20. That is, in the moisturizing flow path 47, the moisturizing liquid flows from the moisturizing liquid storage container 48, which is upstream, to the cap 20, which is downstream. The moisturizing liquid storage container 48 stores a moisturizing liquid.

In the first flow path 51 of the moisturizing flow path 47, the first upstream end 51*u* is coupled to the moisturizing liquid storage container 48 and the first downstream end 51*d* is coupled to the joint section 50. In the second flow path 52 of the moisturizing flow path 47, the second upstream end 52*u* is coupled to the joint section 50 and the second downstream end 52*d* is coupled to the cap 20. In the moisturizing flow path 47, at least the second flow path 52 may be detachable from the joint section 50.

Figure 3:
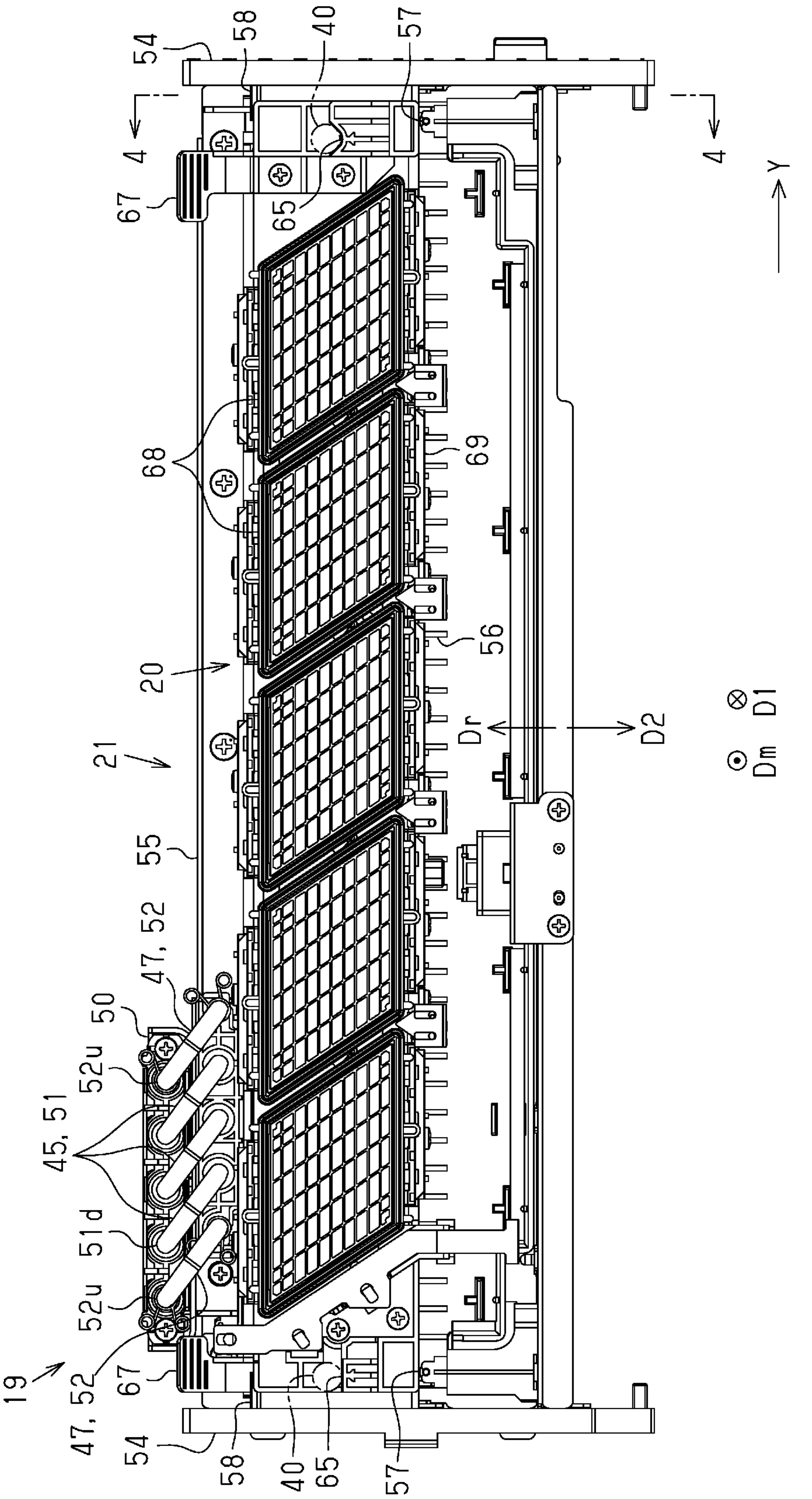
FIG. 3 is a plan view of a capping device as viewed in the first direction.
Figure 4:
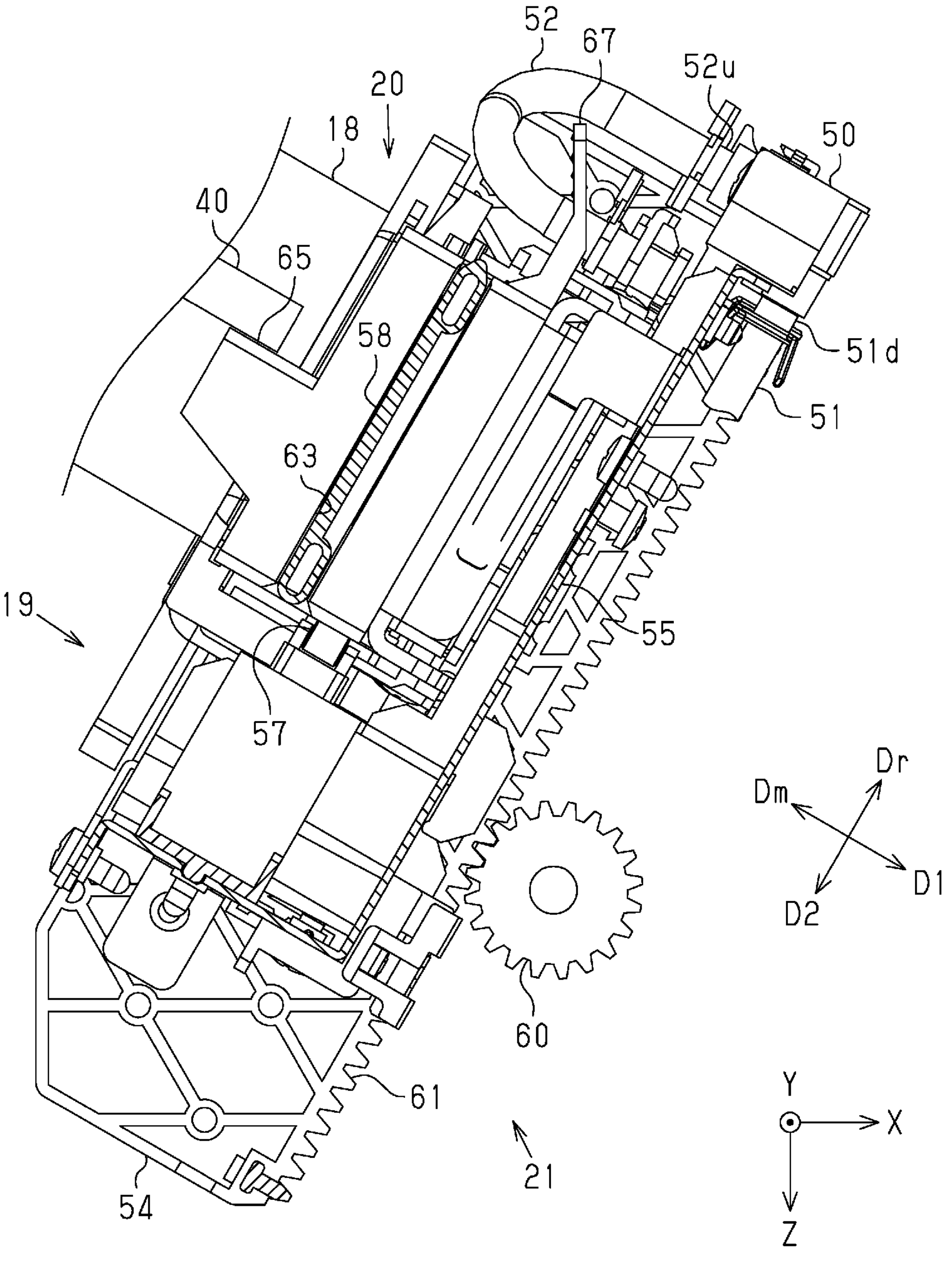
FIG. 4 is a cross-sectional arrowhead view taken along the 4-4 line in FIG. 3.

As shown in FIGS. 3 and 4, the joint section 50 is provided in the cap moving section 21. The joint section 50 may be provided above the cap 20 in the second direction D2. The joint section 50 may be provided at a position that does not overlap with the cap 20 as viewed in the second direction D2. The joint section 50 may be provided side by side with the cap 20 in the first direction D1.

As shown in FIG. 3, the cap moving section 21 may have a pair of guide plates 54, a beam section 55, a convex section 56, a pressing member 57, and a guide section 58.

The beam section 55 supports the pair of guide plates 54 and the cap 20. The beam section 55 may have a plurality of convex sections 56 extending in the second direction D2. By providing the convex section 56 on the beam section 55, friction between the beam section 55 and the cap 20 can be reduced.

The pressing member 57 is, for example, a roller pressed by a spring. The pressing member 57 presses the cap 20 in the removal direction Dr.

The guide sections 58 are convex sections respectively provided on the pair of guide plates 54.

As shown in FIG. 4, the guide section 58 extends in the second direction D2.

The liquid ejection apparatus 11 may include a second drive gear 60. The cap moving section 21 may have a second driven cog 61.

Each of the pair of guide plates 54 may have the second driven cog 61. The second driven cog 61 is, for example, a rack. The second driven cog 61 moves the cap moving section 21 according to rotation of the second drive gear 60, thereby moving the cap 20. The cap moving section 21 moves in the second direction D2 by forward rotation of the second drive gear 60 to position the cap 20 at the retreated position. The cap moving section 21 moves in the removal direction Dr opposite to the second direction D2 by reverse rotation of the second drive gear 60 to position the cap 20 at the capping position.

The cap 20 has a guided section 63. The guided section 63 of this embodiment is a groove extending in the second direction D2. The guided section 63 is guided by the guide section 58. The guided section 63 is configured so as to be detachably attached to the cap moving section 21 from the upper end side of the guide section 58. That is, the cap 20 is configured so as to be detachably attached to the cap moving section 21 from the upstream end of the guide section 58.

The cap 20 may have a positioned section 65. The cap 20 may have the same number of positioned sections 65 as the positioning sections 40. The positioned section 65 can be brought into contact with the positioning section 40 of the liquid ejection head 18. The positioned section 65 is located lower than the positioning section 40 in the second direction D2. The pressing member 57 presses the cap 20 from below. The pressing member 57 presses the cap 20 in a direction in which the positioned section 65 is brought into contact with the positioning section 40 on the second direction D2.

Figure 5:
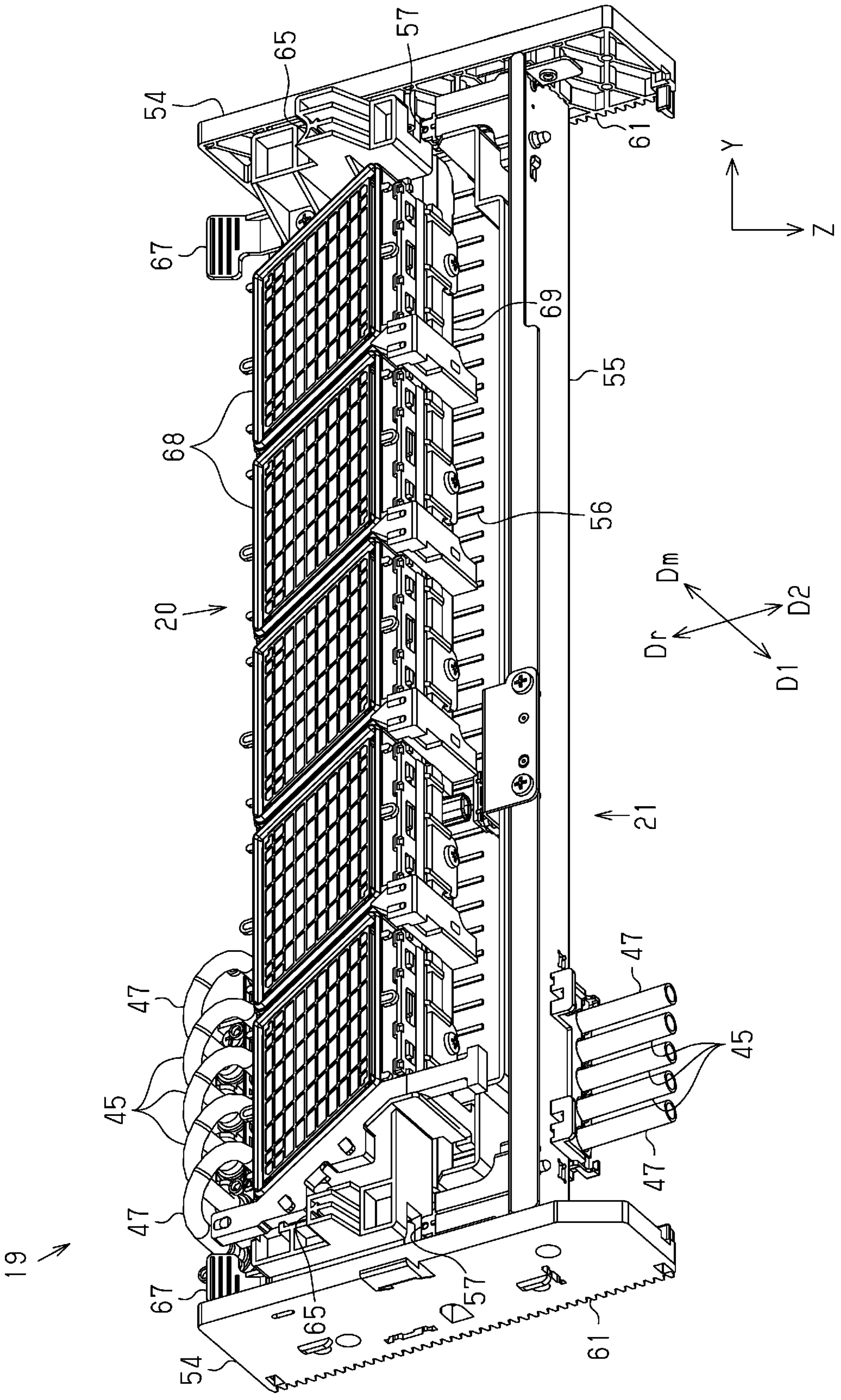
FIG. 5 is a perspective view of the capping device.

As shown in FIG. 5, the plurality of positioned sections 65 may have shapes different from each other. One of the two positioned sections 65 may be in contact with one positioning section 40 on a curved surface, and the other positioned section 65 may be in contact with the other positioning section 40 on a flat surface. The cap 20 is positioned with respect to the liquid ejection head 18 in the second direction D2 and the depth direction Y by the two positioning sections 40 and the two positioned sections 65 according to this embodiment.

The cap 20 may have a grasping section 67, a receiving section 68, and a coupling section 69. The cap 20 is movable with respect to the cap moving section 21 in the second direction D2 and the removal direction Dr opposite to the second direction D2. The cap 20 according to the present embodiment is provided such that the longitudinal direction thereof coincides with the depth direction Y.

The cap 20 may include the plurality of grasping sections 67. The cap 20 according to this embodiment has two grasping sections 67. Two grasping sections 67 may be provided so as to be spaced apart from each other in the longitudinal direction of the cap 20. The grasping section 67 may be provided at an upper portion in the second direction D2. In other words, the grasping section 67 may be located further in the removal direction Dr than the receiving section 68.

The cap 20 may have a plurality of receiving sections 68. The coupling section 69 couples the plurality of receiving sections 68 arranged in the depth direction Y. The receiving section 68 according to the present embodiment is boxshaped. Each receiving section 68 is in contact with the nozzle face 39 and forms a closed space by its opening being closed by the nozzle face 39.

The discharge flow path 45 and the moisturizing flow path 47 are coupled to the receiving section 68. One discharge flow path 45 and one moisturizing flow path 47 may have branched ends coupled to a plurality of receiving sections 68.

The receiving section 68 may receive liquid ejected from the nozzle 38 that accompanies maintenance of the liquid ejection head 18. Specifically, the receiving section 68 may receive liquid ejected from the nozzle 38 that accompanies flushing.

When flushing is performed, first, the head moving section 17 positions the liquid ejection head 18 at the separation position Ps. Thereafter, the cap moving section 21 positions the cap 20 at the cleaning position. The head moving section 17 moves the liquid ejection head 18 in the first direction D1 and stops the liquid ejection head 18 just before the contact position Pt. The cap moving section 21 moves the cap 20 in the moving direction Dm to bring the positioning section 40 and the positioned section 65 into contact with each other. The liquid ejection head 18 performs flushing by ejecting liquid while the liquid ejection head 18 is positioned with respect to the cap 20.

The receiving section 68 may receive the liquid ejected from the nozzle 38 that accompanies pressurization cleaning. Pressurization cleaning is maintenance in which the liquid in the liquid ejection head 18 is pressurized to eject the liquid from the nozzles 38.

Operation of Embodiment

The operation of the present embodiment will be described.

The cap 20 is configured to be detachably attached to the cap moving section 21 in a state in which the cover 27 is opened up and the liquid ejection head 18 is positioned at the separation position Ps.

When replacing the cap 20, the operator may position the cap 20 at the capping position. The cap 20 can be removed by the operator removing the first flow path 51 of the discharge flow path 45 and the second flow path 52 of the moisturizing flow path 47 from the joint section 50.

The operator detaches the cap 20 from the cap moving section 21 by moving the cap 20 in the removal direction Dr while gripping the grasping section 67. The operator attaches the cap 20 to the cap moving section 21 by moving the cap 20 in the second direction D2 in a state where the guided section 63 of the cap 20 is aligned with the guide section 58. The operator couples the first flow path 51 of the discharge flow path 45 and the second flow path 52 of the moisturizing flow path 47 to the joint section 50.

Effects of Embodiment

The effects of this embodiment will be described.

(1) The cap 20 is configured to be detachably attached from the upper end of the guide section 58. Therefore, the operator can easily attach or detach the cap 20 from above. It makes that, the burden of the operator can be reduced.

(2) The first flow path 51 is attachable to and detachable from the joint section 50. Therefore, the cap 20 can be removed by removing the first flow path 51 from the joint section 50. Accordingly, the cap 20 can be easily attached or detached.

(3) The joint section 50 is provided above the cap 20. Therefore, when removing the cap 20 from above, an operator can easily remove the first flow path 51 from the joint section 50. When attaching the cap 20 from above, the operator can easily connect the first flow path 51 to the joint section 50.

(4) The joint section 50 and the cap 20 do not overlap each other as viewed in the second direction D2. That is, the joint section 50 is located at a position at which the joint section 50 does not interfere with the movement of the cap 20 in the second direction D2.

Accordingly, the cap 20 can be easily attached or detached.

(5) The liquid ejection head 18 has the positioning section 40. The cap 20 has the positioned section 65. The pressing member 57 presses the cap 20 to bring the positioned section 65 into contact with the positioning section 40. Therefore, the cap 20 can be positioned with respect to the liquid ejection head 18 with a simple configuration.

(6) The cap 20 has the grasping section 67. The grasping section 67 is provided at an upper portion in the second direction D2. Therefore, when the operator attaches or detaches the cap 20 from above, the operator can attach or detach the cap 20 by holding the grasping section 67. Therefore, the attachability and detachablity of the cap 20 can be further improved.

(7) The liquid ejection head 18 can be positioned at a separation position Ps away from the cap 20. Therefore, by making the cap 20 attachable or detachable in a state in which the liquid ejection head 18 is at the separation position Ps, it is possible to reduce a risk that the cap 20 that is attached or detached hits the liquid ejection head 18.

The cover 27 can open and close the top surface 25 of the housing 12. Since the cap 20 is configured to be attachable and detachable when the cover 27 is opened, the operator can easily attach and detach the cap 20 from above. It makes that, the burden of the operator can be reduced.

Modifications

The present embodiment can be carried out with the following modifications. The present embodiment and the following modifications can be implemented combinations with each other within a technically consistent range.

The second direction D2 may be parallel to the gravity direction Z. That is, the cap moving section 21 may move the cap 20, which has an opening parallel to the nozzle face 39, in the gravity direction Z and in the direction opposite to the gravity direction Z.

The grasping section 67 is not limited to a lever shape supported in a cantilever manner, but may be formed into any shape such as a handle, a recessed section, or a convex section.

The grasping section 67 may be provided at the same position as the receiving section 68 in the second direction D2. The grasping section 67 may be provided below the receiving section 68.

The positioned section 65 may be located higher than the positioning section 40 in the second direction D2. In this case, the positioned section 65 may be positioned with respect to the positioning section 40 by the self-weight of the cap 20.

The joint section 50 may be provided at a position overlapping with the cap 20 as viewed in the second direction D2. The joint section 50 may be provided attachably and detachably, or movably, with respect to the cap moving section 21. The joint section 50 may be provided on the cap 20 and attached and detached together with the cap 20.

The joint section 50 may be provided at the same position as the cap 20 in the second direction D2.

The joint section 50 may be provided below the cap 20 in the second direction D2.

The second flow path 52 may be attachable to and detachable from the joint section 50.

In the discharge flow path 45, the first flow path 51 may be attachable to and detachable from the cap 20. In the discharge flow path 45, the second flow path 52 may be attachable to and detachable from the waste liquid container 46.

The moisturizing flow path 47 may be configured such that the first flow path 51 is attachable to and detachable from the moisturizing liquid storage container 48. The moisturizing flow path 47 may be configured such that the second flow path 52 is attachable to and detachable from the cap 20.

The discharge flow path 45 and the moisturizing flow path 47 may be formed of, for example, one tube having no joint section 50.

The shapes of the guide section 58 and the guided section 63 may be opposite. That is, the guided section 63 of the cap 20 may be formed in a convex shape, and the guide section 58 of the cap moving section 21 may be formed in a groove shape.

The liquid ejection apparatus 11 may be a liquid ejector that ejects or dispenses liquid other than ink. The state of the liquid ejected from the liquid ejection apparatus in the form of minute droplets includes a granular state, a teardrop state, and a thread-like state with a tail. Here, the liquid may be any material that can be ejected from the liquid ejection apparatus. For example, the liquid can be any substance when in its liquid phase, and includes a fluid body such as a liquid body having high or low viscosity, sol, gel water, other inorganic solvents, organic solvents, solutions, liquid resins, liquid metals, and metal melts. The liquid includes not only a liquid as one state of a substance but also a substance in which particles of a functional material composed of a solid such as a pigment or metal particles are dissolved, dispersed, or mixed in a solvent.

Typical examples of the liquid include ink as described in the above embodiments, liquid crystal, and the like.

Here, the ink includes general water-based ink and oil-based ink, and various liquid compositions such as gel ink and hot-melt ink. Specific examples of the liquid ejection apparatuses are apparatuses that eject a liquid containing a material, such as a color material or an electrode material in a dispersed or dissolved form, the material being used for manufacturing a liquid crystal display, an electroluminescence display, a surface emitting display, a color filter, or the like. The liquid ejection apparatus may be an apparatus that ejects a bioorganic substance used for manufacturing biochips, an apparatus used as a precision pipette for ejecting a liquid serving as a sample, a textile printer, a micro-dispenser, or the like. The liquid ejection apparatus may be an apparatus that ejects a lubricating oil to a precision machine such as a watch or a camera in a pinpoint manner, or an apparatus that ejects a transparent resin liquid, such as an ultraviolet curable resin, onto a substrate in order to form a micro-hemispherical lens, an optical lens, or the like that is used in an optical communication element or the like. The liquid ejection apparatus may be an apparatus that ejects an etching liquid such as an acid or an alkali in order to etch a substrate or the like.

Supplementary Notes

Hereinafter, technical ideas grasped from the above-described embodiment and modified examples and effects thereof will be described.

(A) A capping device includes a cap configured to form a closed space by contacting a liquid ejection head configured to eject liquid from a nozzle in a first direction having a horizontal direction component and a gravity direction component, the nozzle opening up into the closed space, and a cap moving section configured to move the cap in a second direction different from the first direction while holding the cap, wherein the second direction has a gravity direction component, the cap moving section has a guide section extending in the second direction, and the cap has a guided section guided by the guide section and is configured to be attachable to and detachable from the cap moving section from an upper end of the guide section.

According to this configuration, the cap is configured to be attachable to and detachable from the upper end side of the guide section. Therefore, the operator can easily attach and detach the cap from above. It makes that, the burden of the operator can be reduced.

(B) The capping device further includes a discharge flow path configured to discharge the liquid in the cap, wherein the discharge flow path has a joint section provided in the cap moving section, a first flow path having a first upstream end coupled to the cap and a first downstream end coupled to the joint section, and a second flow path that, by a second upstream end thereof being coupled to the joint section, is coupled to the first flow path via the joint section, and at least the first flow path may be attachable to and detachable from the joint section.

According to this configuration, the first flow path is attachable to and detachable from the joint section. Therefore, by removing the first flow path from the joint section, the cap can be removed. Therefore, the cap can be easily attached and detached.

(C) In the capping device, the joint section may be provided above the cap in the second direction.

According to this configuration, the joint section is provided above the cap. Therefore, when removing the cap from above, an operator can easily remove the first flow path from the joint section. When attaching the cap from above, an operator can easily couple the first flow path to the joint section.

(D) In the capping device, when viewed in the second direction, the joint section may be provided at a position not overlapping with the cap.

According to this configuration, the joint section and the cap do not overlap each other as viewed in the second direction. That is, the joint section is located at a position that does not interfere with the movement of the cap in the second direction. Therefore, the cap can be easily attached and detached.

(E) In the capping device, the cap includes a positioned section configured to contact a positioning section of the liquid ejection head, the positioned section is located below the positioning section in the second direction, and the cap moving section may have a pressing member that presses the cap in a direction in which the positioned section is brought into contact with the positioning section in the second direction.

According to this configuration, the liquid ejection head has a positioning section. The cap includes a positioned section. The pressing member presses the cap to bring the positioned section into contact with the positioning section. Therefore, the cap can be positioned with respect to the liquid ejection head with a simple configuration.

(F) In the capping device, the cap may have a grasping section at an upper portion in the second direction.

According to this configuration, the cap includes the grasping section. The grasping section is provided at an upper portion in the second direction. Therefore, when an operator attaches or detaches the cap from above, the worker can attach or detach the cap by holding the grasping section. Therefore, the attachability or detachability of the cap can be further improved.

(G) A liquid ejection apparatus, that solves the above problem, includes a liquid ejection head configured to eject a liquid from a nozzle in a first direction having a horizontal direction component and a gravity direction component, the capping device that is configured described above, and a housing that houses the liquid ejection head and the capping device, wherein the housing has a cover configured to open and close at least a part of a top surface of the housing, the liquid ejection head is positionable between a separation position at which the liquid ejection head is separated from the cap and a contact position at which the liquid ejection head moves in the first direction from the separation position and contacts the cap, and the cap is attachable to and detachable from the cap moving section in a state in which the cover is opened and in which the liquid ejection head is at the separation position.

According to this configuration, the liquid ejection head can be positioned at the separation position away from the cap. Therefore, by making the cap attachable or detachable in the state where the liquid ejection head is at the separation position, it is possible to reduce the possibility that the cap, which is to be attached or detached, will contact the liquid ejection head. The cover can open and close a top surface of the housing. Since the cap is configured to be attachable and detachable in a state in which the cover is open, an operator can easily attach or detach the cap from above. It makes that, the burden of the operator can be reduced.

What is claimed is:

1. A capping device comprising:

a cap configured to form a closed space by contacting a liquid ejection head configured to eject liquid from a nozzle in a first direction including a horizontal direction component and a gravity direction component, the nozzle opening up into the closed space; and a cap moving section configured to move the cap in a second direction different from the first direction while holding the cap; and a discharge flow path configured to discharge the liquid in the cap, wherein the second direction includes a gravity direction component, the cap moving section includes a guide section extending in the second direction, and the cap includes a guided section guided by the guide section and is configured to be attachable to and detachable from the cap moving section from an upper end of the guide section, and the discharge flow path includes a joint section provided in the cap moving section and above the cap in the second direction, a first flow path having a first upstream end coupled to the cap and a first downstream end coupled to the joint section, a second flow path that, by a second upstream end thereof being coupled to the joint section, is coupled to the first flow path via the joint section, at least of the second flow path is provided below the cap in the second direction, and at least the first flow path is attachable to and detachable from the joint section.

2. The capping device according to claim 1, wherein when viewed in the second direction, the joint section is provided at a position not overlapping with the cap.

3. The capping device according to claim 1, wherein the cap includes a positioned section configured to contact a positioning section of the liquid ejection head, the positioned section is located below the positioning section in the second direction, and the cap moving section includes a pressing member that presses the cap in a direction in which the positioned section is brought into contact with the positioning section in the second direction.

4. The capping device according to claim 1, wherein the cap includes a grasping section at an upper portion in the second direction.

5. A liquid ejection apparatus comprising:

a liquid ejection head configured to eject a liquid from a nozzle in a first direction including a horizontal direction component and a gravity direction component;

the capping device according to claim 1; and a housing that houses the liquid ejection head and the capping device, wherein the housing includes a cover configured to open and close at least a part of a top surface of the housing, the liquid ejection head is positionable between a separation position at which the liquid ejection head is separated from the cap and a contact position at which the liquid ejection head moves in the first direction from the separation position and contacts the cap, and the cap is attachable to and detachable from the cap moving section in a state in which the cover is opened and in which the liquid ejection head is at the separation position.

* * * * *